US007005998B2

(12) United States Patent
Yamazaki et al.

(10) Patent No.: US 7,005,998 B2
(45) Date of Patent: Feb. 28, 2006

(54) MALFUNCTION-DETECTION METHOD DURING DIE CLAMPING STEP IN INJECTION MOLDING MACHINES

(75) Inventors: Takashi Yamazaki, Shizuoka-ken (JP); Haruyuki Matsubayashi, Shizuoka-ken (JP); Takeshi Abe, Shizuoka-ken (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 11/103,557

(22) Filed: Apr. 12, 2005

(65) Prior Publication Data

US 2005/0179155 A1 Aug. 18, 2005

Related U.S. Application Data

(62) Division of application No. 10/653,923, filed on Sep. 4, 2003, now Pat. No. 6,906,631.

(30) Foreign Application Priority Data

Oct. 23, 2002 (JP) ............................. 2002-308602

(51) Int. Cl.
 *G08B 21/00* (2006.01)
(52) U.S. Cl. .................... 340/679; 340/686.1; 264/40.1
(58) Field of Classification Search ................ 340/525, 340/679, 686.1; 264/40.1, 328.1, 453, 478, 264/37.27, 37.33, 645
See application file for complete search history.

(56) References Cited

U.S. PATENT DOCUMENTS 5,059,370 A * 10/1991 Kojima ........................ 264/102
5,346,657 A 9/1994 Hara et al.
5,753,153 A 5/1998 Choi
5,838,571 A * 11/1998 Lewis .......................... 700/206
6,093,361 A 7/2000 Schad
6,482,338 B1 * 11/2002 Levin et al. ................ 264/40.1
2002/0158359 A1 10/2002 Matsubayashi et al.

FOREIGN PATENT DOCUMENTS

| JP | 01-306061 | 12/1989 |
|----|-----------|---------|
| JP | 05-293862 | 11/1993 |
| JP | 9-85792 | 3/1997 |
| JP | 2001-30326 | 2/2001 |
| JP | 2002-248665 | 9/2002 |

OTHER PUBLICATIONS

Japanese Office Action dated Sep. 27, 2005 for Appln. No. 2002-308602.

* cited by examiner

*Primary Examiner*—Jeffery Hofsass
*Assistant Examiner*—George Bugg
(74) *Attorney, Agent, or Firm*—Pillsbury Winthrop Shaw Pittman, LLP (57) ABSTRACT

The present invention relates to a method of detecting a malfunction during a die clamping step in an injection molding machine. A reference pattern is taken which shows a relation between a die clamping force and a position of a movable platen when die clamping is normally carried out. One or more monitoring sections are set in advance with respect to that position on the basis of the reference pattern and an allowable limit value of a die clamping force in the respective monitoring sections is also set in advance in a form of a linear function of the position. The die clamping force is monitored in the respective monitoring section during a respective die clamping step and, when its value exceeds the allowable limit value, it is decided that a malfunction occurs and an alarm is issued.

6 Claims, 7 Drawing Sheets

MALFUNCTION-DETECTION METHOD DURING DIE CLAMPING STEP IN INJECTION MOLDING MACHINES

This application is a divisional of application Ser. No. 10/653,923 now U.S. Pat. No. 6,906,631 filed on Sep. 4, 2003, and for which priority is claimed under 35 U.S.C. §121. This application relies for priority on Japanese Patent Application No. 2002-308602, filed in Japan on Oct. 23, 2002, under 35 U.S.C. §119. The entire contents of both applications are hereby incorporated by reference in their entireties.

BACKGROUND OF THE INVENTION

1. Field of the Invention

The present invention relates to a malfunction detection method in a die clamping step in an injection molding machine.

2. Description of the Related Art

In an injection molding machine, after a formed product is pushed out of an associated die, dies are closed and clamped, then an injection step is started. For example, Jpn. Pat. Appln. KOKAI Publication Nos. 09-085792 and 2001-030326 discloses a malfunction detection in the die clamping step.

The following is the method described in Jpn. Pat. Appln. KOKAI Publication No. 09-085792. That is, when die clamping is normally carried out, a relation between a torque of a motor for driving a movable platen and a position at that time is taken, and it is recorded as a reference pattern. The monitoring area is divided with respect to the position of the movable platen into a plurality of sections, and an tolerance range of the torque relative to the reference pattern is preset at each section. At the subsequent die clamping step, the variation of the torque with respect to the position is monitored and, if the torque value falls outside the tolerance range for the corresponding section, it is decided that a malfunction occurs and an alarm is issued.

On the other hand, the method described in Jpn. Pat. Appln. KOKAI Publication No. 2001-030326 is as follows. That is, a 'disturbance estimation observer' is provided for estimating a load on a servomotor for driving the die clamping mechanism. The disturbance torque is estimated by the disturbance estimation observer for each die clamping. When the estimated disturbance torque is greater than a later-described upper limit value, an alarm is issued, in which case the upper limit value is obtained from an average of those estimated disturbance torques taken at a plurality of preceding die clamping steps.

In the former system, the torque of the motor for the driving the movable platen with respective to the position is monitored in the die clamping step. Since the tolerance range of the torque has its upper and lower limit values set to be constant for each section, unless the torque falls outside the allowable range in the section, the die clamping step is decided as being normally finished and shifting is made to the next injection step. In this case, a variation rarely occurs in such a way that, in the die clamping operation, up/down vibrations are produced with a given drive motor torque value as a center. Even if, therefore, the monitoring area is divided into a plurality of sections, a complicated variation occurs in respective sections. It is, therefore, necessary that the allowable load range be set to be somewhat broader in the respective section. If, however, there occurs a malfunction, it is not possible to quickly stop the motor.

On the other hand, in the latter system, if the disturbance estimation observer to be able to function properly, any disturbance torque must be sampled for each period and its value must be stored in memory in a control apparatus. It is, therefore, necessary to store its value not only for one die clamping step but also at a plurality of die clamping steps. Thus, it involves a very large amount of data and prevents effective use of a restricted capacity of memory.

Figure 6:
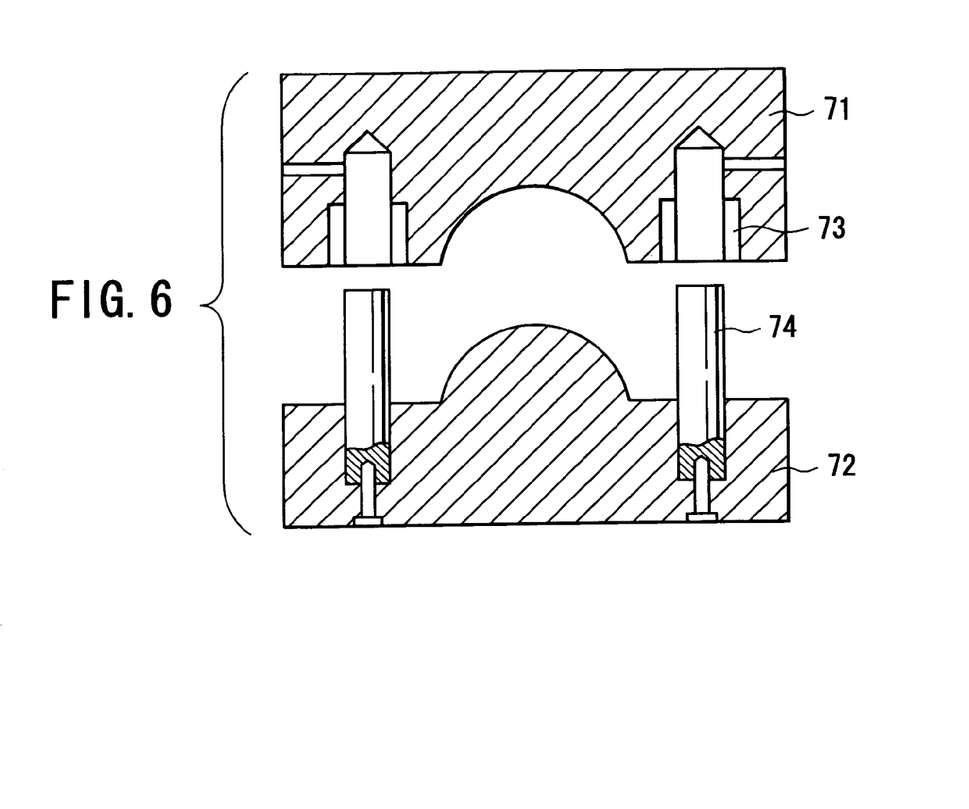
FIG. 6 is a view showing an example of a pair of dies using a guide pin at a time of die clamping.
Figure 7:
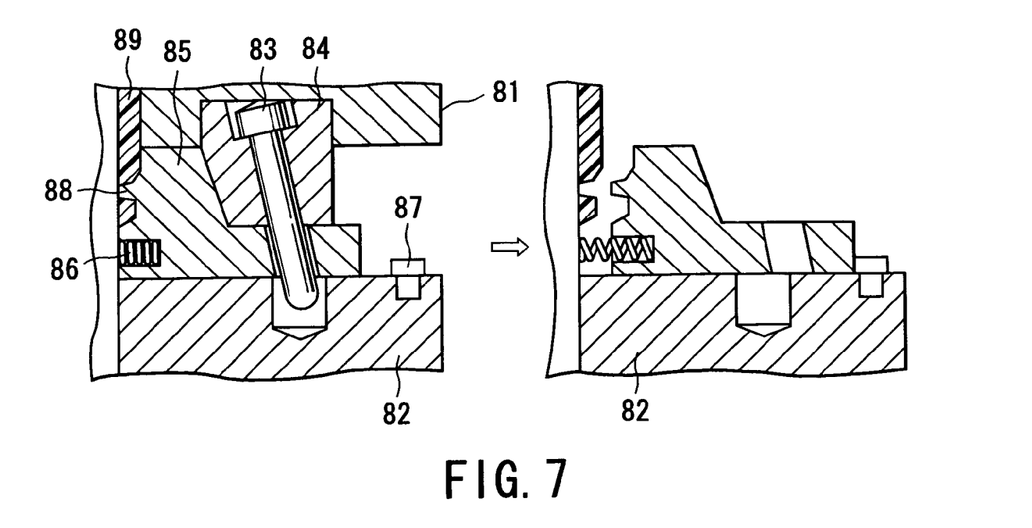
FIG. 7 is a view showing an example of a pair of dies using an angular pin at a time of die clamping.
Figure 8:
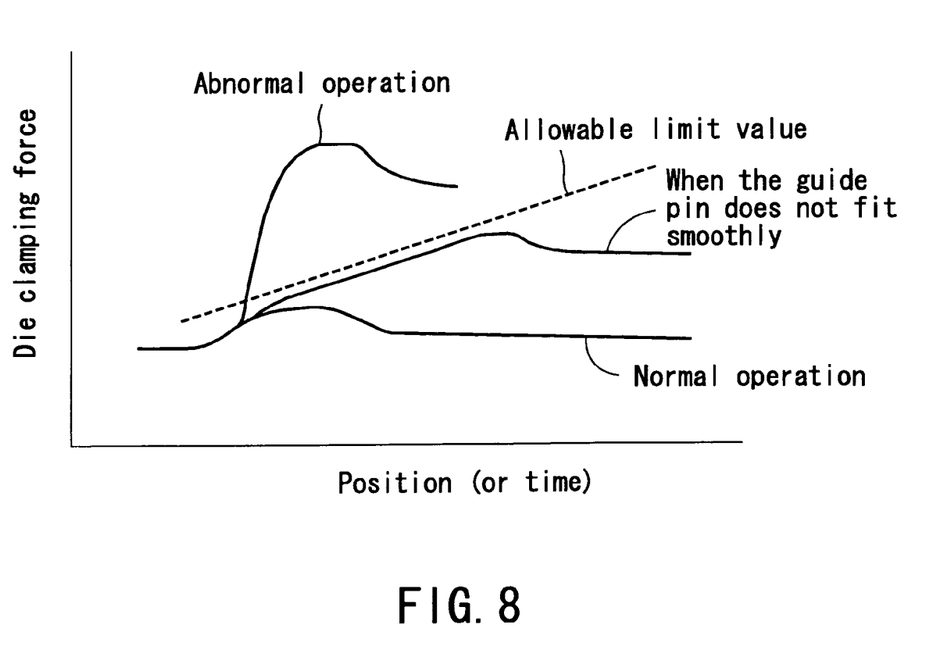
FIG. 8 is a view showing one example of a torque curve when a guide pin fits in an associated guide bush at a time of die clamping.

In order to, in the injection molding, accurately fit together a pair of dies and, by doing so, clamp together the dies, as shown in FIG. 6, a guide pin 74 is mounted at one (movable die 72) of these dies and a corresponding guide bush 73 is embedded in the other die (stationary die 71) to allow the guide pin 74 to be fitted therein. In the case where, as shown in FIG. 7, use is made of dies having an undercut 88, angular pins and slide core 85 are used for swifter removal of a formed product 89. Here, the angular pin 83 is mounted to the fixed die 81 by use of a locking block 84 and the slide core 85 is attached to the movable die 82 by means of a coil spring 86 for core retraction. In this connection it is to be noted that a movable range of the slide core 85 is restricted by a stop block 87.

In the case where, during the die clamping step using such an angular pin, a pair of new dies are first used for die clamping, there is sometimes the case where, as shown in FIG. 7, the pin will not smoothly fit in the bush. Even where, in such a case, the die clamping force becomes somewhat high, if the operation is continued as it is, it is possible to normally finish the die clamping operation. However, in the above-mentioned conventional malfunction monitoring method, there is a higher possibility that the operation will be decided as being in an abnormal state, resulting in the die clamping operation being stopped.

BRIEF SUMMARY OF THE INVENTION

The present invention has been achieved, taking into consideration the problems encountered during the die clamping step of the conventional injection molding machine. It is accordingly the object of the present invention to provide a malfunction detection method which can readily detect malfunction during a die clamping step without greatly complicating a structure of an associated apparatus.

In one aspect of the present invention there is provided a method of detecting a malfunction during a die clamping step, the method being applied when performing die clamping by moving a movable platen toward a stationary platen, comprising: taking a reference pattern showing a relation between a die clamping force and a position of the movable platen when die clamping is normally carried out; setting one or more monitoring sections with respect to the position on the basis of the reference pattern, and setting, in advance, an allowable limit value of the die clamping force in the respective monitoring section in a form of a linear function of the position; and monitoring the die clamping force in the respective monitoring section during the die clamping step and, when its value exceeds said allowable limit value, issuing an alarm.

In the case where the injection molding machine is equipped with an electrically driven die clamping unit using a toggle mechanism, said die clamping force is calculated based on a torque of a motor for driving the toggle mechanism and an expansion/contraction amount of the toggle mechanism.

In the above-mentioned method, in place of the reference pattern showing a relation between the die clamping force and the position of the movable platen, use can be made of a reference pattern showing a relation between a die clamping force and the time elapsed from a start of the die clamping step.

In a variant of the above-mentioned method, when the die clamping force exceeds said allowable limit value, deciding that a malfunction occurs and counting the number of times that a malfunction is detected, instead of issuing an alarm immediately, and an alarm may be issued when the count of malfunctions detected in any monitoring section reaches a predetermined number for the section.

In another variant, the number of times that a malfunction is detected is counted and, when the count of malfunctions detected within a predetermined time reaches a predetermined number for the respective monitoring section, an alarm may be issued.

In another aspect of the present invention, application is made to a hydraulic injection molding machine and, in this case, a hydraulic pressure of a movable platen driving hydraulic pump may be monitored in place of the die clamping force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The malfunction detection method during the injection molding step in an injection molding machine according to the present invention will be explained below by way of example by referring to the accompanying drawings. In this example, it is assumed that the method of the present invention is applied to an electric injection molding machine.

Figure 1:
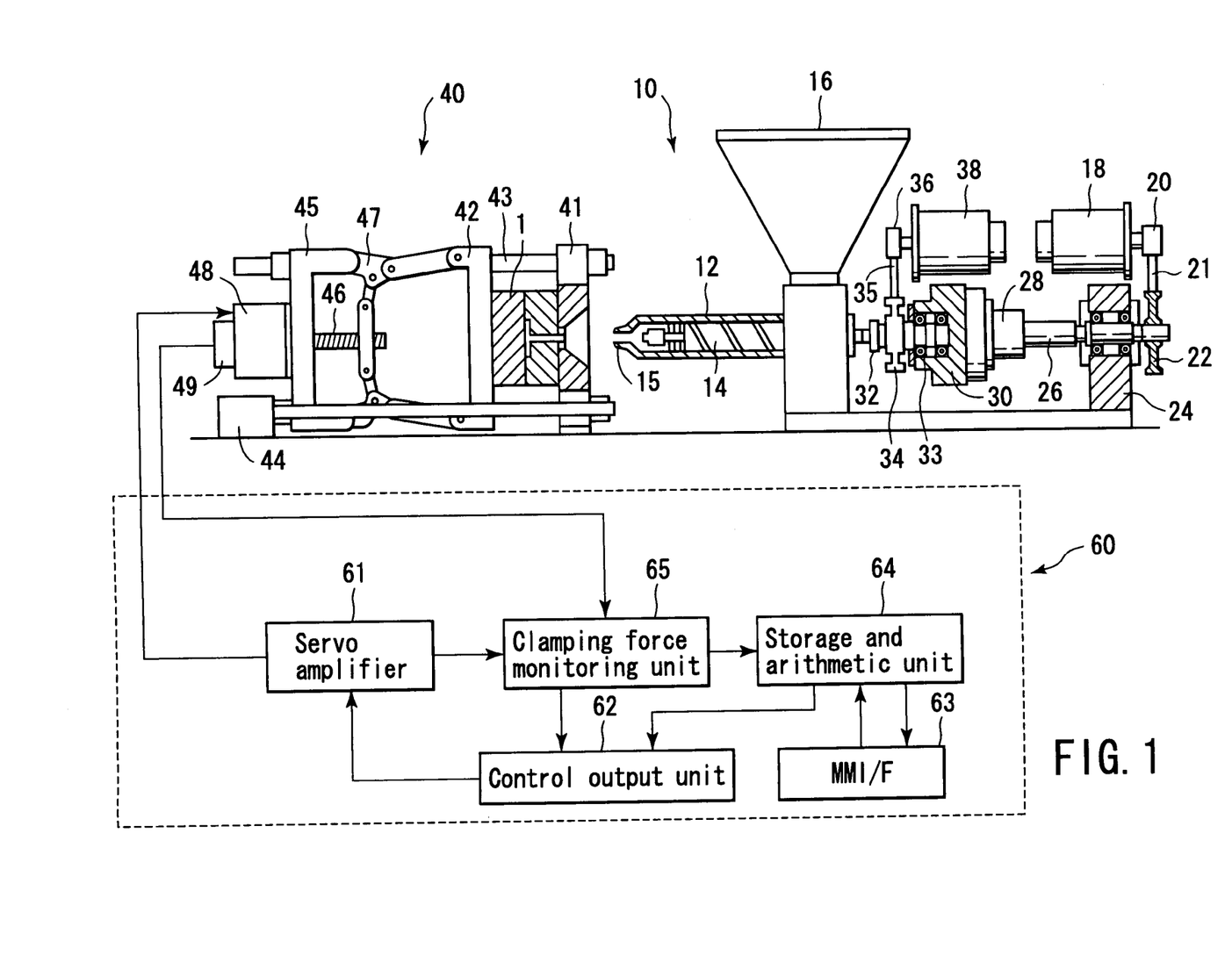
FIG. 1 is a view schematically showing a structure of an electric injection molding machine applied to a malfunction detection method according to the present invention.

FIG. 1 shows a structure schematically showing an electric injection molding machine. In the Figure, reference numeral 1 represents a pair of dies, 10 an injection unit, 40 a die clamping unit, and 60 a control unit.

The injection unit 10 comprises a heating barrel 12, a screw 14, a linear driving mechanism (18 to 30) for the screw 14, and a rotational drive mechanism (30 to 38) for the screw 14.

The heating barrel 12 has a nozzle 15 at a tip end (at a left side in FIG. 1) and a hopper 16 is connected near its rear end. The nozzle 15 is connected to a gate provided at a back surface of the dies 1. The screw 14 is held within the heating barrel 12. The rear end of the screw 14 is connected to a shaft 32. The shaft 32 is rotatably supported in the thrust box 30 with a bearing 33 therebetween.

A servomotor 38 for charging is supported above the thrust box 30. The shaft 32 is connected to the servomotor 38 through a pulley 34, a timing belt 35 and a pulley 36.

The thrust box 30 is connected through a ball screw (nut 28 and threaded rod 26) to a servomotor 18 for injection as follows. That is, the nut 28 of the ball screw is fixed to the back surface of the thrust box 30. The threaded rod 26 of the ball screw is rotatably supported, near its rear end, in a fixed plate 24 with a bearing therebetween. The servo motor 18 is supported above the fixed plate 24. The rear end portion of the threaded rod 26 of the ball screw is connected to the servomotor 18 through a pulley 22, a timing belt 21 and a pulley 20.

By driving the servomotor 38 to cause the screw 14 to be rotated within the heating barrel 12, a raw material resin is fed from a hopper 16 into the heating barrel 12. The fed resin, while being heated and kneaded, is fed toward the tip end side of the heating barrel 12 and a resultant molten resin is stored in the tip end portion of the heating barrel 12. By the pressure of the molten resin, the screw 14 is moved backward within the heating barrel 12.

By driving the servomotor 18 to cause the threaded rod 26 of the ball screw to be rotated, the thrust box 30 is moved in a forward/backward direction, so that the screw 14 within the heating barrel 12 is moved in a forward/backward direction. After a predetermined amount of molten resin has been stored within the tip end portion of the heating barrel 12, the screw 14 is moved forward within the heating barrel 12 and the molten resin is sent into the dies 1 through the nozzle 15.

The die clamping unit 40 comprises a stationary platen 41, a movable platen 42, tie bars 43, and a toggle type die clamping mechanism (45 to 49). The dies 1 are mounted between the stationary platen 41 and the movable plate 42. The stationary platen 41 and link housing 45 are connected together through tie bars 43. The movable platen 42 is supported at the front surface of the link housing 45 through the toggle mechanism 47. A geared motor 44 for die thickness adjustment and servomotor 48 for die clamping are supported on the back surface side of the link housing 45. The geared motor 44 is connected on the rear end side (on the left side in FIG. 1) of the tie bar 43. The toggle mechanism 47 is connected to the servomotor 48 through a crosshead 46.

By driving the geared motor 44, a distance between the stationary plate 41 and the link housing 45 is adjusted to a suitable value corresponding to the thickness of the dies 1. By driving the servomotor 48, the crosshead 46 is moved forward and backward, so that the toggle mechanism 47 is expanded and contracted to allow the dies to be closed and opened.

The control unit 60 comprises a servo amplifier 61, a control output unit 62, an MMI/F (man/machine interface) 63, a storage and arithmetic unit 64, and a die clamping force monitoring unit 65.

The operator of this machine sets the molding conditions, such as a die clamping condition through the MMI/F 63. The servo amplifier 61 drives the servomotor 48 for die clamping. The die clamping force monitoring unit 65 monitors the position of the crosshead 46 sent as data from the position detector 49 and also monitors a drive torque of the servomotor (for die clamping) 48 from the servo amplifier 61 in a form converted to the die clamping force. Further, the die clamping force monitoring unit 65 sends these data items to the control output unit 62 and storage and arithmetic unit 64. The storage and arithmetic unit 64 stores the molding conditions inputted through the MMI/F 63 and data items such as the position of the crosshead 46 and die clamping force sent via the die clamping force monitoring unit 65, and transmits the molding condition to the control output unit 62. Further, the storage and arithmetic unit 64 sends, as needed, data for constituting a display screen to the MMI/F 63. The control output unit 62 delivers a instruction to the servo amplifier 61 on the basis of the data items sent from the storage and arithmetic unit 64 and die clamping force monitoring unit 65.

Figure 2:
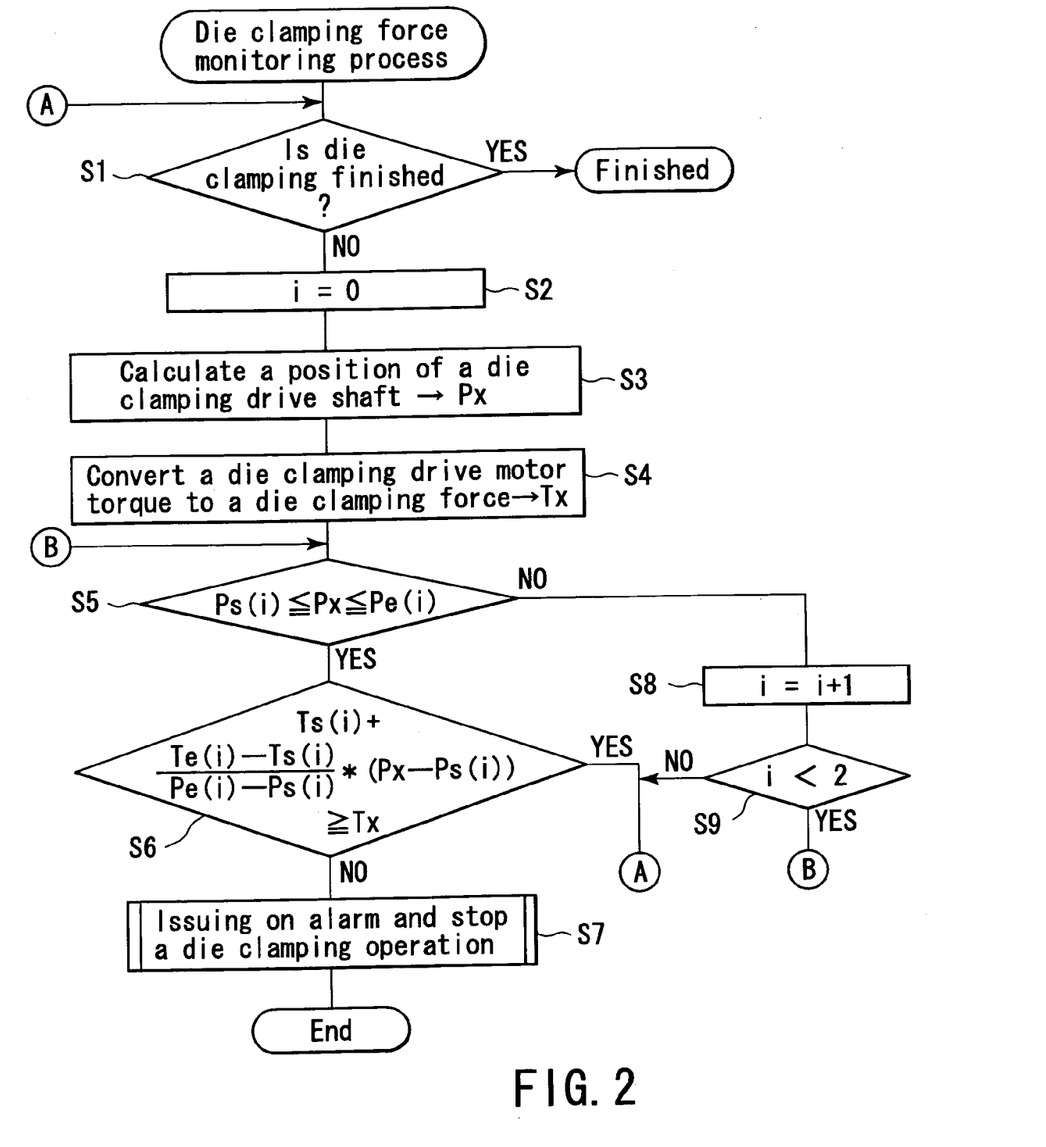
FIG. 2 shows a flow chart of one embodiment of a control program for carrying out a malfunction detection method according to the present invention.

With reference to FIG. 2 and Table 1, an explanation will be made below about the die clamping force monitoring method in the electric injection molding machine thus structured.

Table 1 below shows one example of the method for setting monitoring sections and deciding conditions during the die clamping step. In this example, respective monitoring sections are set by inputting their starting and ending positions, and the deciding conditions for the respective monitoring sections are set by inputting the allowable upper limit value of die clamping force in the starting and ending positions. The allowable upper limit value at a halfway point of the respective monitoring section is set in a form of a linear function of the position on the basis of the allowable upper limit value at the starting and ending positions. The operator inputs the data items to the control unit 60 via the MMI/F 63 (FIG. 1) and the inputted data items are stored in the storage and arithmetic unit 64.

TABLE 1

Setting Method of Monitoring Sections and Deciding Conditions

| | Monitoring Sections | |
|---|---|---|
| | 0 | 1 |
| Starting Positions of Monitoring Sections | Ps (0) | Ps (1) |
| Ending Positions of Monitor Sections | Pe (0) | Pe (1) |
| Upper Limit Value of Die Clamping Force at Starting Position | Ts (0) | Ts (1) |
| Upper Limit Value of Die Clamping Force at Ending Position | Te (0) | Te (1) |

With reference to the flow chart shown in FIG. 2, an explanation will be given below about a flow in a die clamping force monitoring process.

This monitoring process is performed in parallel with the control of the die clamping operation. First, it is decided whether or not the die clamping is ended. If NO, a subsequent process is carried out and, if YES, the die clamping force monitoring process is also ended (S1).

Then, an initializing process necessary for the subsequent process is carried out. First, an index i for internal processing is initialized (S2) and the position Px of the die clamping drive shaft is calculated out (S3). In the calculation of that position, use is made of output data from the position detector 49 which is incorporated in the servomotor 48 for die clamping. A torque value of the servomotor 48 is calculated and converted to a die clamping force Tx (S4). This torque value is calculated from an electric current which is supplied from the servo amplifier 61 to the servomotor 48.

Then, it is decided whether or not the calculated position Px of the die clamping drive shaft falls within monitoring sections (S5). If YES, it is decided whether or not the die clamping force Tx, which is converted from the torque value of the servomotor 48, is equal to or less than the allowable upper limit value (S6). If YES, it is regarded as being in a normal state and the process is returned back to a step S1. If NO, it is decided that a malfunction occurs and an alarm is issued. As a result, a signal to that effect is transmitted to the control output unit 62 (FIG. 1) and the die clamping operation is stopped (S7) and hence the die clamping force monitoring process is ended.

If, at step (S5), the calculated position Px of the die clamping drive shaft falls outside the preset monitoring section, "1" is added to the index i for internal process (S8) and, if the index i is less than 2, the process goes back to step S5. If the index i is equal to or greater than 2, the process goes back to step S1. The reason that steps S5 and S6 are done in the case where the index i is 0 and 1 is because two monitoring sections are set as shown in Table 1. If, therefore, the monitoring section comprises three sections, another column item is added to the Table 1 and, in this case, the index i for internal processing is in a range of 0, 1 and 2 and the process of FIG. 2 is carried out.

Figure 3:
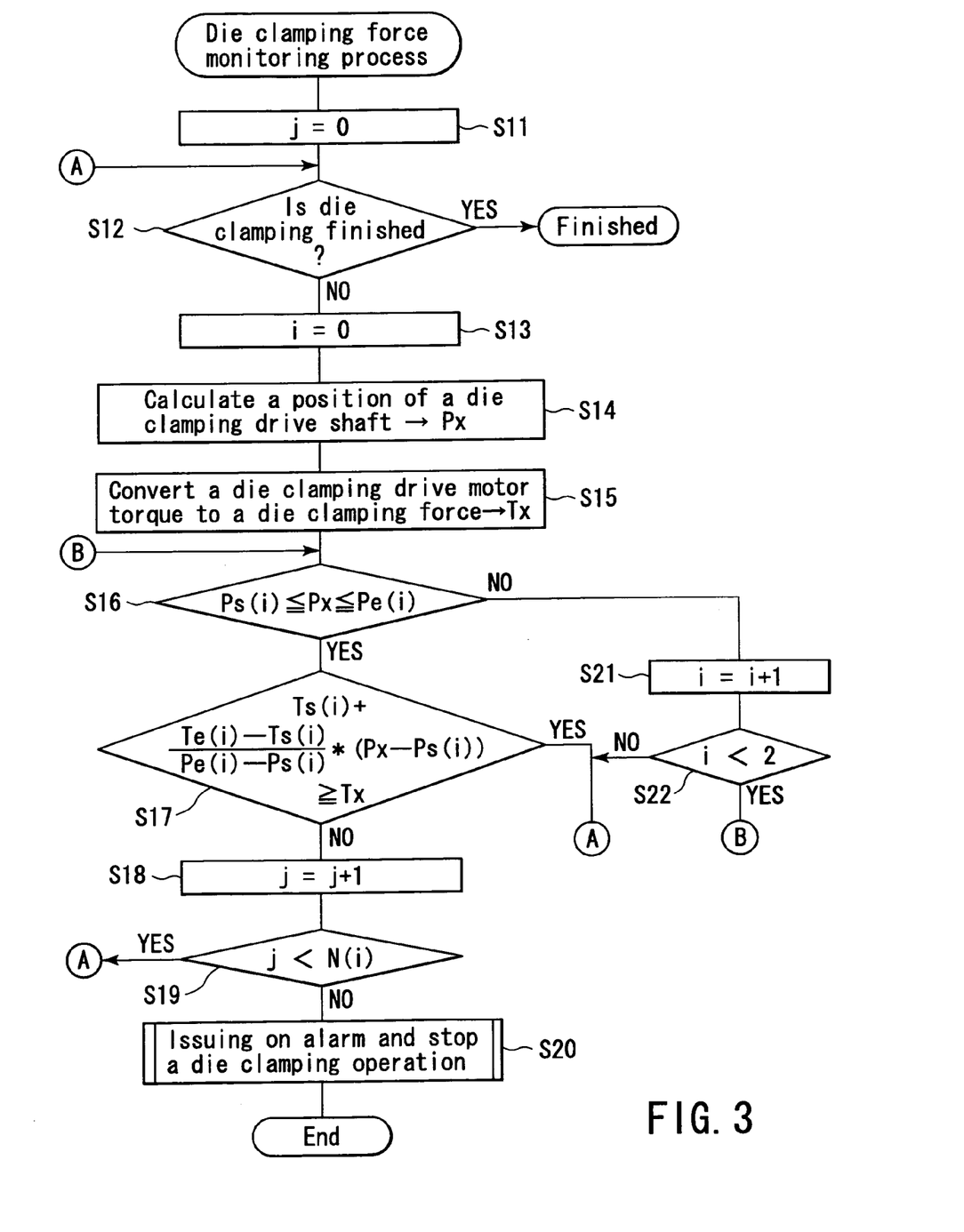
FIG. 3 shows a flow chart of another embodiment of a control program for carrying out a malfunction detection method according to the present invention.

With reference to FIG. 3 and Table 2, an explanation will be made below about another example of a malfunction detection method done in the die clamping step in the injection molding machine based on the present invention. In this example also, it is assumed that the present invention is applied to the electric injection molding machine.

Table 2 below shows the setting method of monitoring sections and deciding conditions. In this example, an allowable value N(i) corresponding to the number of times that malfunction occurs in respective monitoring sections is set and an alarm is issued when the number of malfunctions detected reaches this allowable value. In other aspects, in the same way as the preceding case, respective monitoring sections are set by inputting their starting and ending positions and deciding conditions are set by inputting an allowable upper limit value of the die clamping force in the starting and ending positions of the respective sections. The allowable upper limit value at a halfway point of the respective monitoring section is set in a form of a linear function of the position on the basis of the allowable upper limit value at the starting and ending positions.

TABLE 2

Setting Method of Monitoring Sections and Deciding Conditions

| | Monitoring Sections | |
|---|---|---|
| | 0 | 1 |
| Starting Positions of Monitoring Sections | Ps (0) | Ps (1) |
| Ending Positions of Monitor Sections | Pe (0) | Pe (1) |
| Upper Limit Value of Die Clamping Force at Starting Position | Ts (0) | Ts (1) |
| Upper Limit Value of Die Clamping Force at Ending Position | Te (0) | Te (1) |
| Number of Allowable Abnormal State Occurring Times | N (0) | N (1) |

In FIG. 3, first, a counter j for counting the number of times that malfunction occurs is reset (S11). Then it is decided whether or not the die clamping step is ended. If NO, a subsequent process is carried out and, if YES, the die clamping torque monitoring process is ended (S12).

Then, an initializing process necessary to perform a subsequent processing is done. First, an index i for internal processing is initialized (S13) and a die clamping shaft position Px is calculated out (S14). In the calculation of that position, use is made of output data from the position detector 49 which is incorporated into the servomotor 48 for die clamping. And the torque value of the servomotor 48 is calculated and converted to a die clamping force Tx (S15). This torque value is calculated from an electric current which is supplied from the servo amplifier 61 to the servomotor 48.

Then, it is decided whether or not the calculated position Px of the die clamping drive shaft falls within any monitoring sections (S16). If YES, it is decided whether or not the clamping force Tx, which is converted from the torque value of the servomotor 48, is equal to or less than the allowable upper limit value (S17). If YES, it is regarded as being in a normal state and the process goes back to step S12. If NO, it is decided that a malfunction occurs and "1" is added to a counter j for counting the number of times that malfunction occurs (S18). Then, it is decided whether or not a resultant number is less than the preset number of times (S19). If YES, no alarm is generated and the process goes back to step S12. If NO, an alarm is issued and a signal to that effect is transmitted to the control output unit 62 (FIG. 1). As a result, the die clamping operation is stopped (S20) and the die clamping force monitoring process is ended.

If, at step 16, the calculated position Px of the die clamping drive shaft is not within any preset monitoring section, "1" is added to an index i for internal processing (S21) and, if the index i is less than 2, the process goes back to step 16. If the index i is equal to or greater than 2, the process goes back to S1.

In this case, it is assumed that, in Table 2, the monitoring section is comprised of two monitoring sections. If the monitoring section is comprised of three sections, another column item is added to the Table 2 and the process of FIG. 3 is performed in a range of 0, 1 and 2.

Figure 4:
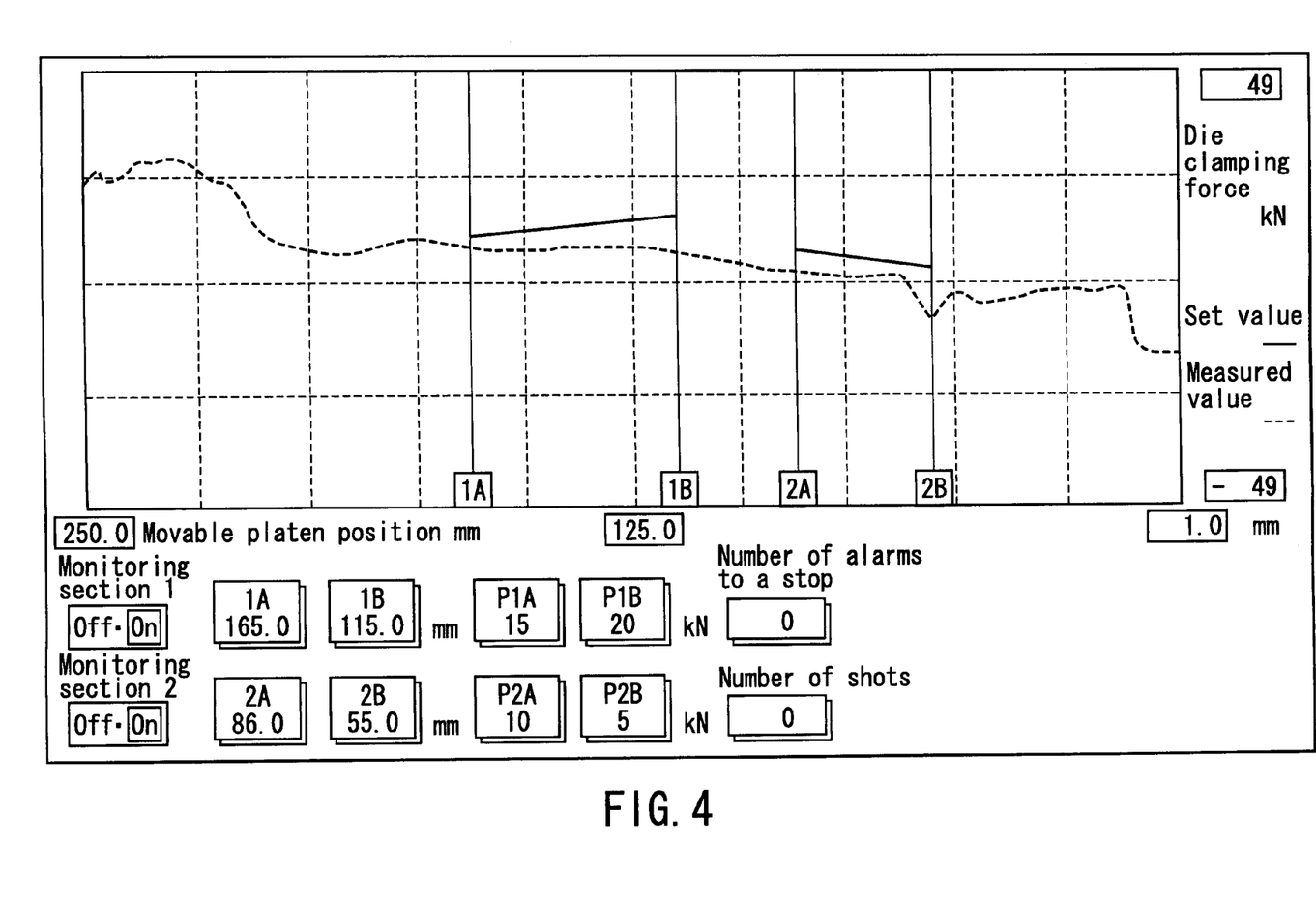
FIG. 4 is a view showing one example of a display screen for use in setting die clamping force monitoring sections and allowable upper limit values when the malfunction detection method is carried out according to the present invention.

FIG. 4 shows an example of a display screen in the case where the die clamping force monitoring sections and allowable upper values are set according to the method of the present invention. In this example, two sections (1A–1B, 2A–2B) are set as the monitoring sections. The starting position (1A) of the monitoring section 1 is 165.0 mm and the ending position (1B) of the monitoring section is 115.0 mm. The allowable die clamping force (P1A) at the starting position is 15 kN and the allowable die clamping force (P1B) at the ending position is 20 kN. Further, the starting position (2A) of the monitoring section 2 is 86.0 mm and the ending position (2B) of the monitoring section is 55.0 mm. The allowable die clamping force (P2A) at the starting position is 10 kN and the allowable die clamping force (P2B) at the ending position is 5 kN.

Although, in the above description, the method of the present invention has been explained as being applied to the electric injection molding machine, the present invention can also be substantially equally applied to a hydraulic injection molding machine.

Figure 5:
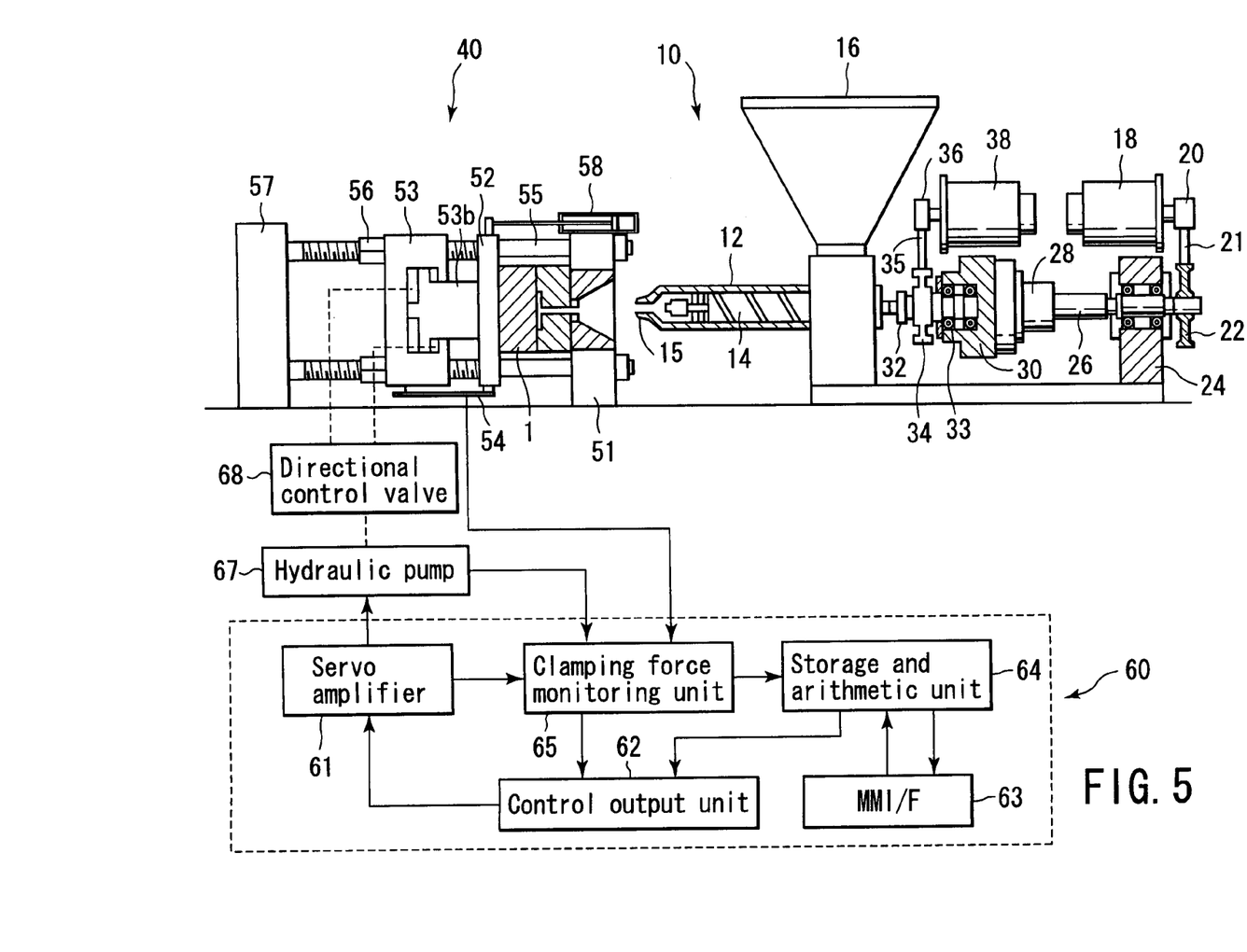
FIG. 5 is a view schematically showing a hydraulic injection molding machine applied to the malfunction detection method based on the present invention.

FIG. 5 shows a schematic diagram illustrating the structure of a hydraulic injection molding machine. In the figure, reference numeral 51 represents a stationary platen, 52 a movable platen, 53 a hydraulic actuator for die clamping, 54 a position detector, 58 a hydraulic actuator for die closing and opening, 67 a variable hydraulic pump, and 68 a directional control valve.

In this case, a hydraulic actuator 53 is used in place of the toggle mechanism(45 to 49) used in the previous embodiment. The stationary platen 51 and the back plate 57 are connected by four tie bars 55. A through-hole is formed at each of four corners of the movable platen 52. The four tie bars 55 are passed through the corresponding through-holes. The movable platen 52 slides back and forth along the tie bars 55 by the hydraulic actuator 58.

The hydraulic actuator 53 is connected to the back surface of the movable platen 52. Lead screws are formed in the tie bars 55 near the back plate 57 side. The cylinder of the hydraulic actuator 53 is linked to the lead screws with half nuts 56. The tip end of the ram 53b of the hydraulic actuator 53 is fixed to the back surface of the movable platen 52. During die clamping steps, these half nuts 56 are clamped around the lead screws, and maintain the position of the hydraulic actuator 53.

The hydraulic actuator 53 is driven by the hydraulic pump 67. The moving direction of the actuator 53 is switched by the directional control valve 68. The position of the movable platen 52 is detected by the position detector 54. The servo-amplifier 61 controls the hydraulic pump 67 while monitoring the pressure of the pump 67 and the position of the movable platen 52.

According to the malfunction detection method of the present invention, even if the guide pin does not smoothly fit in the associated guide bush when a new pair of dies are initially used and, in this case, a somewhat higher die clamping torque is required than at a normal time, this state is not decided that a malfunction occurs and it is possible to continue a die clamping operation as it is and to effect a shift to an injection step. In addition, it is possible to further reduce a the necessary data storage area over the prior art system, and hence free-up more data storage area for other applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of detecting a malfunction during a die clamping step in an injection molding machine, the method being applied when performing die clamping by moving a movable platen toward a stationary platen, comprising:

taking a reference pattern showing a relation between a die clamping force and time when die clamping is normally carried out;

setting one or more monitoring sections with respect to said time on the basis of the reference pattern, and setting, in advance, an allowable limit value of the die clamping force in the respective monitoring section in a form of a linear function of said time; and monitoring the die clamping force in the respective monitoring section during the die clamping step and, when its value exceeds said allowable limit value, issuing an alarm.

2. The method according to claim 1, wherein said injection molding machine is equipped with an electrically driven die clamping unit using a toggle mechanism, and said die clamping force is calculated based on a torque of a motor for driving the toggle mechanism and expansion/contraction amount of the toggle mechanism.

3. A method of detecting a malfunction during a die clamping step in an injection molding machine, the method being applied when performing die clamping by moving a movable platen toward a stationary platen, comprising:

taking a reference pattern showing a relation between a die clamping force and time when die clamping is normally carried out;

setting one or more monitoring sections with respect to said time on the basis of the reference pattern, and setting, in advance, an allowable limit value of the die clamping force in the respective monitoring section in a form of a linear function of said time; and monitoring the die clamping force in the respective monitoring section during the die clamping step and, when its value exceeds said allowable limit value, deciding that a malfunction occurs and counting the number of times that a malfunction is detected; and issuing an alarm when the count of malfunctions detected in any monitoring section reaches a predetermined number for the section.

4. The method according to claim 3, wherein said injection molding machine is equipped with an electrically driven die clamping unit using a toggle mechanism, and said die clamping force is calculated based on a torque of a motor for driving the toggle mechanism and expansion/contraction amount of the toggle mechanism.

5. A method of detecting a malfunction during a die clamping step in an injection molding machine, the method being applied when performing die clamping by moving a movable platen toward a stationary platen, comprising:

taking a reference pattern showing a relation between a die clamping force and time when die clamping is normally carried out;

setting one or more monitoring sections with respect to said time on the basis of the reference pattern, and setting, in advance, an allowable limit value of the die clamping force in the respective monitoring section in a form of a linear function of said time; and monitoring the die clamping force in the respective monitoring section during the die clamping step and, when its value exceeds said allowable limit value, deciding that a malfunction occurs and counting the number of times that a malfunction is detected; and issuing an alarm when the count of malfunctions detected within a predetermined time reaches a predetermined number for the respective monitoring section.

6. The method according to claim 5, wherein said injection molding machine is equipped with an electrically driven die clamping unit using a toggle mechanism, and said die clamping force is calculated based on a torque of a motor for driving the toggle mechanism and expansion/contraction amount of the toggle mechanism.

* * * * *